US012696836B2

(12) United States Patent
Thompson

(10) Patent No.: US 12,696,836 B2
(45) Date of Patent: Aug. 4, 2026

(54) FOUR-ARMED LAWNMOWER BLADE IN SAME CUTTING PLANE FROM A SINGLE METAL SHEET

(71) Applicant: Mark Lee Thompson, Thomasville, NC (US)

(72) Inventor: Mark Lee Thompson, Thomasville, NC (US)

( * ) Notice: Subject to any disclaimer, the term of this patent is extended or adjusted under 35 U.S.C. 154(b) by 316 days.

(21) Appl. No.: 18/233,918

(22) Filed: Aug. 15, 2023

(65) Prior Publication Data

US 2025/0057077 A1 Feb. 20, 2025

(51) Int. Cl.
*A01D 34/73* (2006.01)
*A01D 101/00* (2006.01)

(52) U.S. Cl.
CPC .......... *A01D 34/73* (2013.01); *A01D 2101/00* (2013.01)

(58) Field of Classification Search
CPC ............................ A01D 34/73; A01D 2101/00
See application file for complete search history.

(56) References Cited

U.S. PATENT DOCUMENTS 2,619,786 A 12/1952 Ream
3,336,737 A * 8/1967 Belfiore ............... A01D 34/828
56/295
3,389,541 A * 6/1968 Freedlander ........... A01D 34/73
56/295

3,780,509 A * 12/1973 Woelffer ................ A01D 34/73
56/295
3,973,378 A * 8/1976 Bartasevich ......... A01D 34/305
56/246
3,975,891 A 8/1976 Gunther
4,262,476 A * 4/1981 Benenati .............. A01D 34/005
56/295
4,351,144 A * 9/1982 Benenati .............. A01D 34/005
56/295
5,033,259 A 7/1991 Adcock
5,299,414 A 4/1994 Long
5,327,710 A * 7/1994 Plamper .................. A01D 34/73
56/DIG. 17
5,353,581 A * 10/1994 Rouse .................... A01D 34/73
56/255

(Continued)

FOREIGN PATENT DOCUMENTS

AT 372569 B * 10/1983 ............. A01D 34/73
AU 2014216226 B2 12/2017

(Continued)

*Primary Examiner* — Arpad Fabian-Kovacs
(74) *Attorney, Agent, or Firm* — Joel W. Sawyer

(57) ABSTRACT

A lawnmower blade stamped or laser cut from a single metal sheet arranged as four blade arms of equal length on a single cutting plane that can resemble a cruciform shape. This design yields a uniform strength and reliability and does not rely on nuts, bolts, and multipart construction, and with minimal effect on overall weight. Each blade extends outward from a center mounting, possesses an offset, a sharpened leading edge and oppositely a deflection portion that is curved upward to produce a consistent suction force and circulating air flow useful during high moisture conditions. The leading edges all rotate in a single cutting plane to produce a level grass cut. The blade is capable of easy installation on a wide range of lawnmowers, but with a focus on commercial models and applications.

9 Claims, 4 Drawing Sheets

Lawn Mower Blade - Top View

Figure 1:
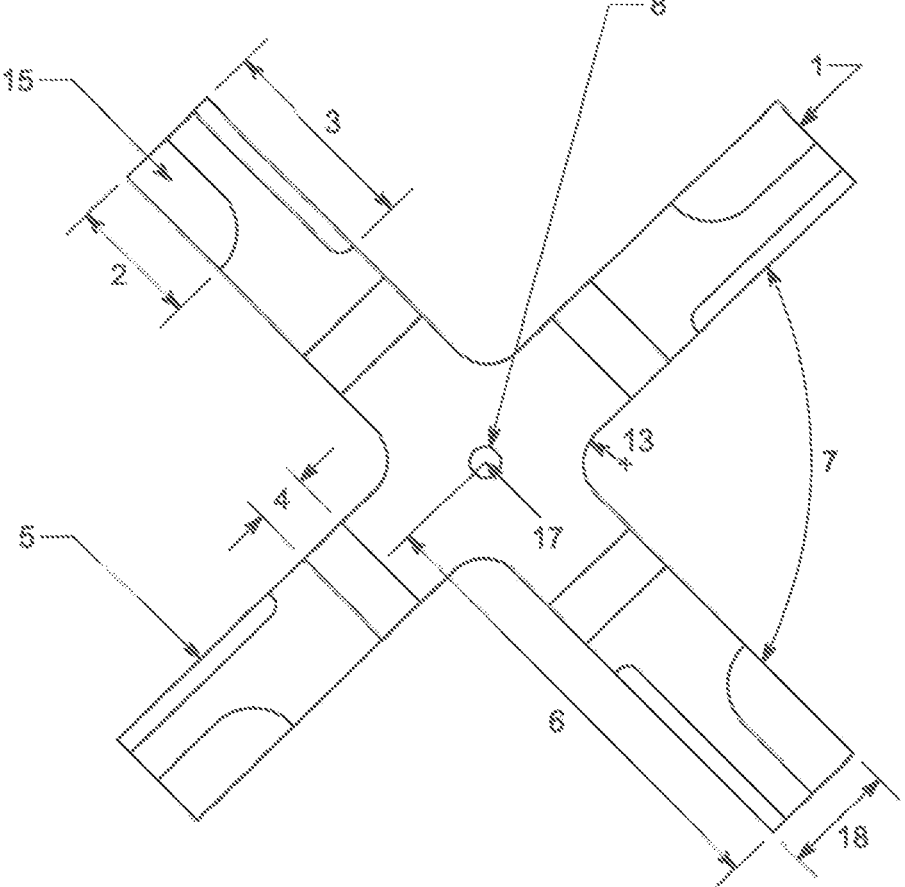

Lawn Mower Blade - Front and Right Side View

(56)  References Cited

U.S. PATENT DOCUMENTS

| | | | | |
|---|---|---|---|---|
| 5,669,213 | A * | 9/1997 | Britton | A01D 34/005 |
| | | | | 56/DIG. 17 |
| 5,711,141 | A * | 1/1998 | Pitman | A01D 34/73 |
| | | | | 56/DIG. 17 |
| 5,890,354 | A * | 4/1999 | Bednar | A01D 34/005 |
| | | | | 56/DIG. 17 |
| 6,052,979 | A * | 4/2000 | Tutschka | A01D 34/73 |
| | | | | 56/DIG. 17 |
| 6,490,850 | B1 * | 12/2002 | Seegert | A01D 34/005 |
| | | | | 56/DIG. 17 |
| 7,610,740 | B2 | 11/2009 | Myers | |
| 7,617,664 | B1 | 11/2009 | Fitzpatrick | |
| 2002/0066263 | A1 | 6/2002 | Megli | |
| 2006/0042216 | A1 * | 3/2006 | Warashina | A01D 34/826 |
| | | | | 56/255 |
| 2006/0162310 | A1 * | 7/2006 | Dittmer | A01D 34/005 |
| | | | | 56/289 |
| 2007/0074497 | A1 | 4/2007 | Myers | |
| 2015/0047308 | A1 | 2/2015 | Schreiner | |
| 2015/0052868 | A1 * | 2/2015 | Schreiner | A01D 34/66 |
| | | | | 56/289 |
| 2015/0052869 | A1 * | 2/2015 | Roth | A01D 34/81 |
| | | | | 56/295 |
| 2015/0271997 | A1 * | 10/2015 | Kurioka | A01D 34/68 |
| | | | | 56/255 |
| 2019/0045707 | A1 * | 2/2019 | Patridge | A01D 34/66 |
| 2020/0093060 | A1 * | 3/2020 | Kurihara | A01D 34/68 |
| 2021/0289697 | A1 * | 9/2021 | Kurihara | A01D 34/685 |
| 2024/0090371 | A1 * | 3/2024 | Nichols | A01D 34/81 |

FOREIGN PATENT DOCUMENTS

| | | | | |
|---|---|---|---|---|
| CA | 1059323 | A | 7/1979 | |
| CA | 1300383 | C | 5/1992 | |
| CN | 214126041 | U | 9/2021 | |
| CN | 216451937 | U | 5/2022 | |
| CN | 218353330 | U | 11/2022 | |
| CZ | 23093 | U1 | 12/2011 | |
| DE | 2010882 | A1 * | 3/1971 | A01D 34/73 |
| EP | 0280393 | A1 | 1/1988 | |
| EP | 1181858 | B1 | 8/2001 | |
| EP | 3597023 | A1 * | 1/2020 | A01D 34/005 |
| ES | 2258133 | T3 * | 8/2006 | A01D 34/005 |
| GB | 2028625 | A * | 3/1980 | A01D 34/005 |
| GB | 2418588 | A * | 4/2006 | A01D 34/826 |
| JP | H10210839 | A | 8/1998 | |
| JP | 2021029114 | A | 3/2020 | |
| JP | 2023037961 | A | 3/2023 | |
| KR | 102091316 | B1 | 3/2018 | |
| WO | WO1998020727 | A1 | 11/1997 | |
| WO | WO2006/035226 | A1 | 5/2006 | |

* cited by examiner

Lawn Mower Blade – Top View

Lawn Mower Blade - Front and Right Side View

Lawn Mower Blade - Top View

Lawn Mower Blade - Top View

FOUR-ARMED LAWNMOWER BLADE IN SAME CUTTING PLANE FROM A SINGLE METAL SHEET

STATEMENT REGARDING PRIOR DISCLOSURE BY THE INVENTOR

The first disclosure of the invention was made to the inventor's sister on Feb. 5, 2023.

I. FIELD OF THE INVENTION

The field of the invention is within the domain of "mowers" and further within the domain of "cutting apparatus."

II. BACKGROUND OF THE INVENTION

The first lawnmower was built about two hundred years ago and received an English patent for its improvement on manicuring the lawns of not just large, aristocratic estates but primarily for the maintaining of athletics fields. Obviously, the lawnmower has seen many advancements since then. These include both steam-powered and even electric models originating in the Industrial Revolution near the turn of the century, and soon after the gas-powered model became preponderant corresponding to the ascending automotive industry. Today many lawnmowers are gas-powered, but battery-powered electric models are becoming more prevalent due to improvements in battery-cells and the delivery of a threshold-level of horsepower to a motor.

We have long since passed, therefore, mechanical reel mowers, also known as cylinder mowers, which were operated by pushing a circular blade-system where the center rotating axis was parallel to the ground. Modern lawnmowers are known as rotary mowers. Various blade systems are currently in use based on a host of market and environmental factors, and they each have their efficacies based on their particular targeted uses. The current market and production trend is away from traditional gas-powered mowers to those battery operated, otherwise known as electric.

Push lawnmowers generally contain a single blade and commercial lawnmowers generally contain 2 to 3. The generally recognized maximum blade tip speed is about 216 mph (18,900 SFM). Slowly turning blades shred and damage the grass as opposed to the clean cut produced by blades at or near the maximum blade tip speed. In order to produce a clean cut at faster travel speeds without increasing the blade tip speed above 216 mph, more blades must be incorporated to have more cuts per inch of travel. Commercial lawnmowers move at standard speeds of 5 to 7 mph when conditions are suitable. Within these travel speeds and maximum blade tip speed, the industry standard lawnmower will move forward cutting grass at a distance of 1⅝" to 2⅜" per blade revolution.

Considering that each blade extends outward from the spindle which is driven by either a belt or being geared into a motor—it can be said that there are two blade arms, sharpened on the leading edge, that is, the forward side of rotation. Some blades are curved upward along the trailing edge of the arm shaft to create an upward air flow. This process creates suction that helps pull the grass up to be cut and also mulch it in the chamber area above the blade.

Generally, blades can be grouped into three distinct categories in the modern marketplace: standard, high-lift, and mulching. Standard blades are what is commonly thought of with respect to a standard lawnmower. They are built to produce a clean, efficient cut before discharging the clippings either outward through a discharge port onto a lawn or into a collection area such as a cloth bag.

High lift blades are different. They have more of a deflection on the trailing edge in order to produce upward airflow which help to collect the grass clippings into a bag area. They can be used for harder to cut jobs, such as large commercials landscapes, yards of high acreage, and sports fields, and are often found on riding mowers.

Mulching blades commonly feature a curved surface with two separate sharp edges and less lift. Depending on the design of the housing deck, when closed-in the mulching blades can circulate clipped grass to both cut and re-cut into tiny pieces. This process can produce smaller grass residue which can decompose faster to add nutrients to the lawn, releasing nutrients into the soil. Mulching blades are the most versatile in the industry because they can mulch grass, eject and spread clippings across a lawn while mowing, or in some circumstances bag them depending on the mower design, although mulching blades are not often used for bagging since they have a lower discharge volume of air.

Amongst industry standard blades are also so-called "gator" blades that contain slotted trailing edges used to better cut difficult lawn jobs. These are a single blade design—two arms—that have both a sharp edge on the trailing edge in order to chop leaves up when they are dry thus removing the need to remove the leaves from the lawn.

How does the present invention compare to and contrast the prior art? The present invention is an improvement over the prior art for several reasons. As a replacement blade made from a single metal sheet, there is no center plate or disc on which the blade assembly is mounted, usually through nuts and bolts. In other words, the present invention generally weighs less than it could by using fewer materials, and also takes up less space within the housing chamber of the mower. This allows the invention to be a replacement for single blade (two arms) lawnmowers with engines intended for a single blade. Moreover, as cut from a single sheet of metal, the invention is able to maintain strength even though constructed with a minimal amount of material. And when producing the blade, it is tempered to a uniform hardness throughout; some parts of a multipart blade would have some parts generally harder than others.

The range of cross-shapes in the present invention allows for greater applications in terms of mulching ability due to the curvature of the arms, and also provides a cleaner grass cut, since the present invention has four spaced-out blade-arms arranged to cut on a single plane. Also, current double-bladed lawnmowers do not cut on a single plane, since one blade is usually bolted or otherwise fastened to the top of the other. Thus, maintaining if not improving mulching capability while arranging cutting blades within a single plane for a cleaner grass cut are two additional improvements.

It is also worth noting that for current double-bladed lawnmowers where one blade is bolted on top of the other, it is possible that the vibration of continuous lawnmower use risks loosening these bolts to the point of critical failure since they bear tremendous pressure whenever the blade hits a solid object like a rock, and this is especially true for do-it-yourself kits where the bolts are not factory-grade and put together in the factory setting.

Because the present invention is cut from a single metal sheet, it maintains a uniform thinness. This thinness in the center where the fastening hole is located allows for it being used in OEM applications. Current "quad-cut" lawnmower blades, that is, those arranged in a cross, are commonly fastened together in the center through a plating system consisting of nuts and bolts instead of being sheered from a single metal sheet. This center plating that is stacked together—at least two blades along with fastening apparatus—renders challenges in installing among some industry-standard lawnmowers, as the spindles may not be of sufficient length to allow the blade to be fastened. The present invention overcomes these problems.

Furthermore, the invention improves performance during rainy days. Commercial lawnmowers commonly weigh considerably more than those designed for homeowners with yards of smaller size. A drawback of these commercial mowers is that the wheels place substantial pressure on the grass as it rolls over, so there is a need for a greater updraft, lift or suction from the lawnmower blade in order to pull the grass up so that it can be cut. The present invention improves upon the prior art by helping to keep the lawnmower deck clean under high moisture conditions, as the present invention provides greater suction and also a greater discharge velocity of grass that has been cut. Also, an industry-standard high lift blade may not have as great a lifting force or as much discharge volume as the invention.

Commercial mowers commonly "stripe" a yard by using a press roller mounted behind the mower deck to press the grass down after cutting. When a yard is mowed in a back and forth manner this produces a striped pattern because the grass is pressed down in two different directions. In order for this to work the grass needs to be cut higher to allow it to bend down. If the grass is cut low it will just stand straight up. The higher the grass is mowed the less rigid and more flexible it becomes. Thus, a greater lifting force is needed to lift the taller grass and hold it vertically before it is cut.

In summary, the present invention improves upon the prior art in the following ways: 1) providing for more effective lift; 2) creating more efficient grass discharge; 3) reducing and inhibiting grass build-up in the cutting chamber especially under high moisture conditions; 4) producing more discharge volume; and 5) allowing for a faster mower travel speed while still maintaining a crisp cut. The improvements are not necessarily limited to this list.

III. Brief Summary of the Invention

The invention is a lawnmower blade apparatus that resembles two identical blades positioned like a cross or flattened "x" shape arrangement where the angle between each of the two smaller opposite-sided angles is within the range of 45 degrees to 90 degrees, inclusive—at 90 degrees there would be four right angles and thus four identical quadrants. This apparatus is constructed from a single metal sheet through stamping or laser cutting. Each of the four resulting blade arms has a sharpened leading edge on a single cutting plane. Each of the four blade arms extend outward generally straight from where connected to a center spindle or motor shaft common to industry-standard lawnmowers. Opposite to the sharpened leading edge is a deflection portion curved upward at an angle and also an offset or recessed depth to protect the center mounting. The design produces an upward suction to draw the grass into the chamber for cutting and a circulating force to help expel the cut grass from the chamber. The single piece construction eliminates additional weight created by the use of nuts and bolts, and can be used as a replacement blade on a wide range of lawnmowers, but with an emphasis on the commercial aspect. Industry-standard lawnmower engines and motors provide adequate torque and the thinness allows room for placement on the spindles for stock blades that are thicker due to multipart construction.

IV. BRIEF DESCRIPTION OF THE DRAWINGS

Figure 2:
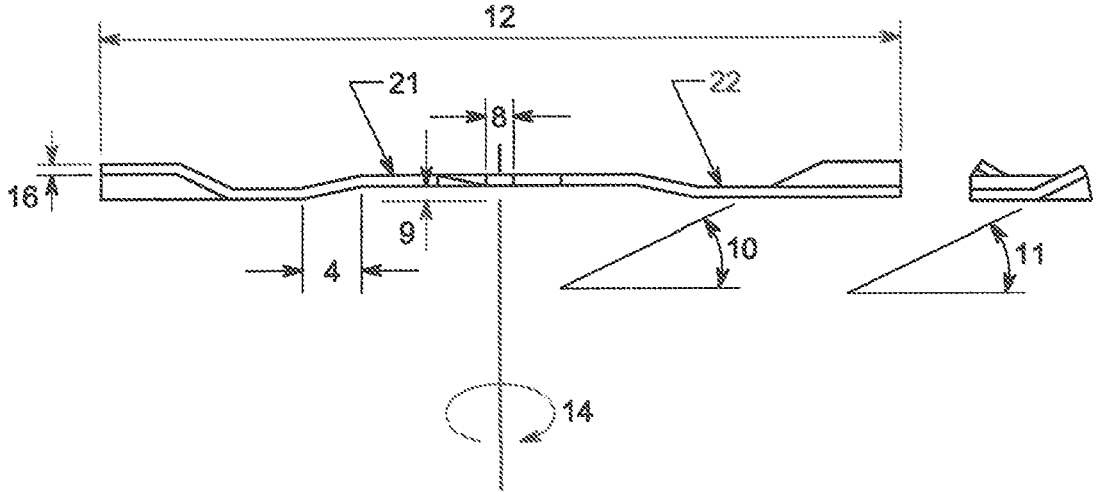
Figure 3:
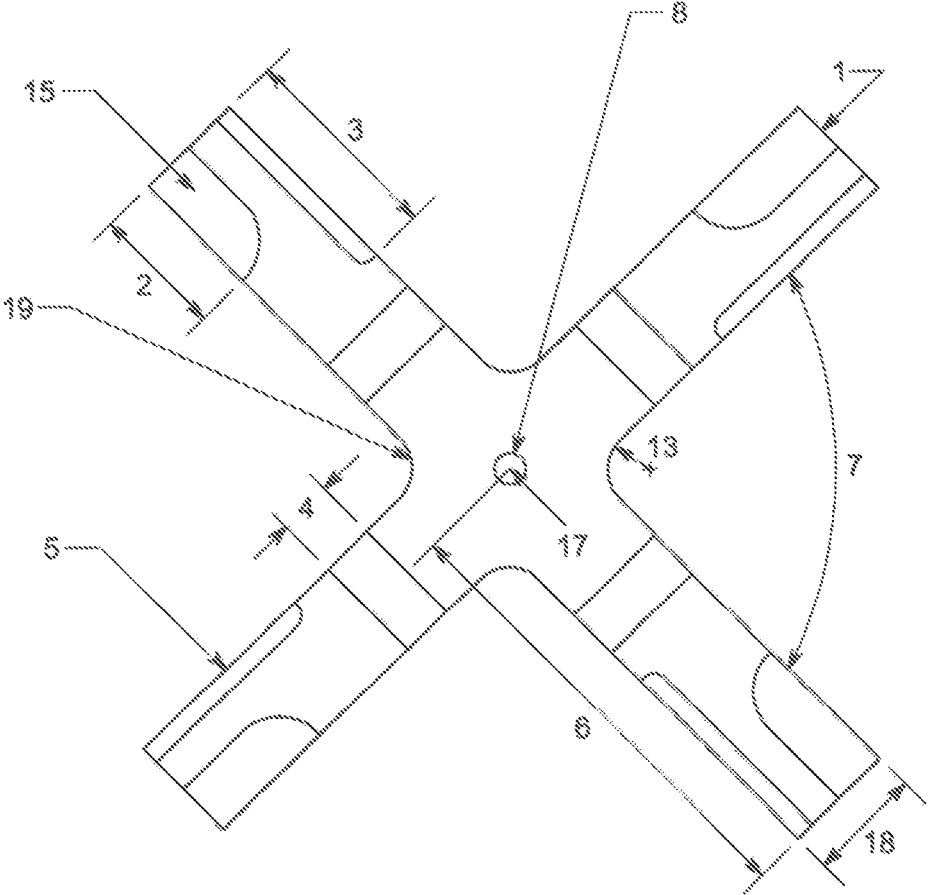
Figure 4:
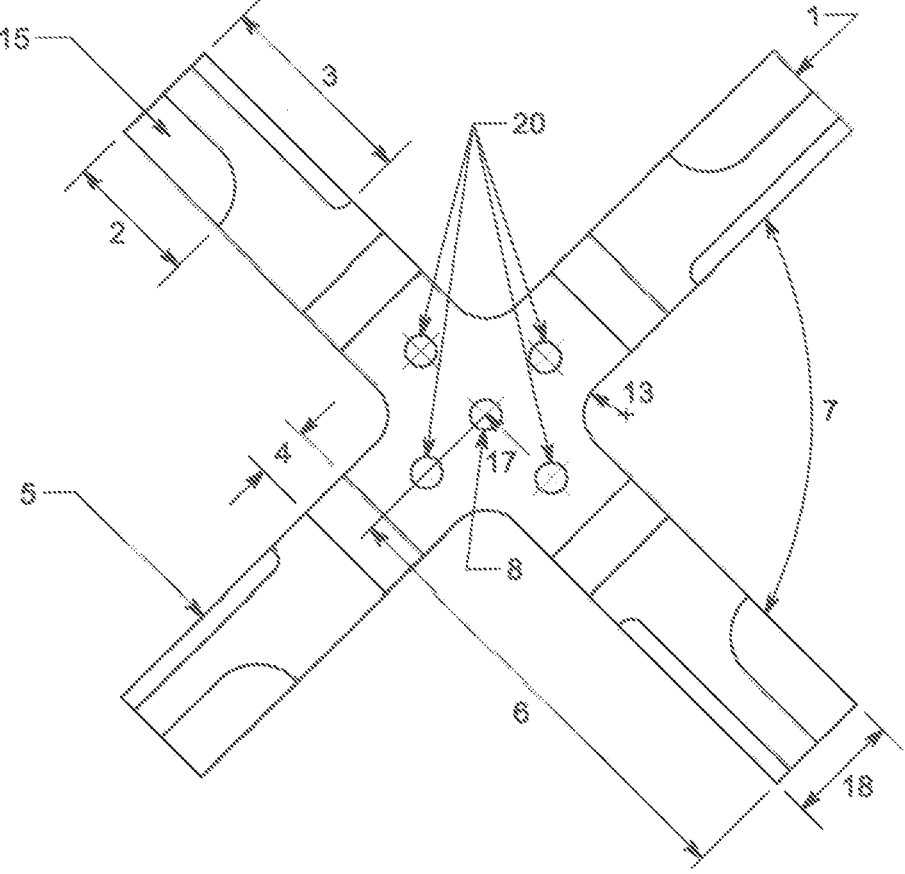

FIG. 1, FIG. 2, and FIG. 3 are depictions of the lawnmower blade from the top view, while FIG. 2 is the front and right side view. The blade apparatus consists of four blade arms (1) in a cruciform arrangement. In FIG. 1 one blade arm is identified (1) and each of the four are identical. There is a raised or deflection area (15) to provide a lifting force and a circulating force and this length (2) is 33% of the arm length. A leading edge (5) is sharpened to a length (3) that is 47% of the arm length (6). The blade has an area where the blade is offset (4 in FIG. 1 and FIG. 2) to provide a recessed depth (9 in FIGS. 2 and 19 in FIG. 3) in order to provide some protection for the mounting system from hitting the ground. The arms of the blade have an angle of separation (7) which is 90 degrees and have a radius (13) between the arms. There is a centrally located hole (8) for attaching the blade to the shaft. The arm of the blade is bent to an angle (11) and is 27 degrees. The angle of transition (10) from the horizontal to the deflection area (15) is 27 degrees. The blade has an overall length (12), and rotates around a vertical axis (17) in a direction (14). The blade has a thickness (16) and a width (18). (21) and (22) identify the upper blade plane and lower blade plane, respectively. (20) in FIG. 4 identifies additional mounting holes in a different embodiment.

V. DETAILED DESCRIPTION OF THE INVENTION

A. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

B. Four-armed Lawnmower Blade in Same Cutting Plane from a Single Metal Sheet The present invention is a lawnmower blade apparatus that has four blade arms (1) of equal length (6), where each blade arm has a substantial portion sharpened on the leading edge (5) in the direction of rotation (14). This sharpened edge length (3) in the preferred embodiment is 47% of the arm length, but can range from 30% to 60%. It begins at a point on the blade arm and extends continuously to the end, which is the most outward portion from the center hole for mounting (8). The four blade arms (1) are arranged such that they appear as if two identical blades overlap and the resulting double-blade or four blade arms are from the range of 45 degrees to 90 degree angles, inclusive, to each other on opposite sides of the narrowest angle where they cross, which is the angle of separation (7), rendering shapes generally described as in the range of an flattened "x" (45 degrees) to a plus ("+") shape (90 degrees). All four blade arms are within the same cutting plane where sharpened on the leading edge (5), and will rotate within the lawnmower deck in a plane perpendicular to the point of attachment to the rotating spindle, which is the vertical axis of rotation (17). The side opposite on each blade arm to the sharpened side has a deflection area (2) curved upward beginning at a point and extending to the end of the blade arm and in the preferred embodiment is 33% of the arm length (6), but can range from 20% to 60%. This deflection portion is shorter than the sharpened edge length (3) in the preferred embodiment. The deflection angle (11) is the angle by which the deflection portion is angled upward as shown in FIG. 2 and is 27 degrees in the preferred embodiment, but can be within the range of 20 degrees to 40 degrees. This deflection area (15) is raised beginning on each blade arm and extending in a straight line at 27 degrees to form the transition angle (10) until reaching the height, wherein the top portion of the this deflection area (15) is parallel to the cutting plane. The length of the blade (12) is the same as the diameter of the circular area created when the double-blades are rotating and is common to the OEM (Original Equipment Manufacturer).

Each of the four blade arms has an offset (4), which is a small dip or recession for the purpose of protecting the center point of connection for the blades from bottoming out on something like a rock and getting damaged. Each offset (4) is located between the beginning of the arm length and the start of the sharpened area. It begins within the range of 3.5 to 4.5 inches from the beginning of the arm length (6) at the hole for mounting (8), and is 3.5 inches in the preferred embodiment. Moreover, each offset (4) ranges from 0.5 inches to 0.875 inches in depth, and is 0.625 inches in depth in the preferred embodiment, and is angled uniformly in the range of 10 to 20 degrees to reach the depth of said offset; the angle is 12 degrees in the preferred embodiment. Concerning the blade width (18), each of the arm-blades range from 1.75 inches to 2.5 inches, and is 2.25 inches in the preferred embodiment. The thickness (16) of each blade arm ranges from 0.125 inches to 0.25 inches, and is ³⁄₁₆ inches in the preferred embodiment. The end of the blade arm is generally uniform and on the same vertical plane. The leading edge of one blade arm and the trailing edge of another blade arm closest to it are joined with a radius (13) to prevent the blade arm from breaking upon impact with an object; in effect, if they were joined at a right angle they would be weaker at this point.

The center of the blade apparatus contains a single, circular hole (8), surrounded by a recessed depth (9 in FIG. 2) (19 in FIG. 3) on each blade arm, where the hole is at the center of the recessed depth, too, for mounting onto a lawnmower spindle or motor shaft for an engine or motor, but can contain a plurality of holes (20) distanced in a uniform pattern away from this center hole (8). Their position maintains the even balance of the blade while providing extra holes for mounting. The diameter of the center hole is common in the industry to allow it to be mounted onto a host of industry-standard lawnmowers from various manufacturers. Important to the invention is that there is no center plate or disk to which the blade arms are mounted. In particular, the recessed depth (19 in FIG. 3) is the hub area of the blade unit which rotates on a separate plane from the lower cutting plane of the leading edge. These planes are parallel, and the separation distance is from 0.5 to 0.875 inches between the two planes. The upper blade plane (21) of the recessed depth and the lower blade plane (22) of the leading edge are shown in FIG. 2.

The process of constructing the invention begins by selecting a single metal or metal alloy sheet of the desired thickness and composition. The invention can be stamped or laser cut from the sheet. The blade can be formed to shape in one stroke of a press using a new four arm mold or formed in two strokes using an existing two arm mold.

The blade arms are formed to shape where each blade arm is bent and pressed to create an offset to protect the center axis area, and then the blade arms are raised to create a deflection angle and deflection area. After, they are sharpened on the leading edge (5) in the range of 30 to 60 percent of said length and this leading edge extends to the tip of each blade arm. Last, the apparatus is tempered to within industry recognized standards to produce a uniform hardness.

I claim:

1. A lawnmower blade apparatus comprising:
   a. four blade arms of equal length on a single cutting plane arranged such that they appear as if two identical blades overlap and the resulting said four blade arms are from the range of 45 degrees to 90 degree angles, inclusive, to each other on opposite sides of the narrowest identical angles where they cross to form an angle of separation;
   b. wherein said blade arms are sharpened on a leading edge in the direction of rotation in the range of 30 to 60 percent of said length and extending to the end of said blade arms;
   c. wherein said apparatus is laser cut or stamped on one mold from a single metal sheet which contains a circular hole at the center of a recessed depth for mounting onto a spindle or motor shaft from a lawnmower motor or engine, such that said four blade arms, including their offsets and deflection areas, are integrally formed from said single metal sheet;
   d. wherein said apparatus further contains said offset beginning anywhere from 3.5 to 4.5 inches on each of said four blade arms measured from the center axis of rotation;
   e. wherein said offset is angled uniformly in the range of 10 to 20 degrees to reach the depth of said offset;
   f. wherein each of said four blade arms has an upward deflection angle in the range of 20 to 40 degrees on the side opposite of said leading edge beginning at said end of said blade arms and extending inward in the range of 20 to 60 percent of said radial length and extending to said end of said blade arms to create said deflection area;
   g. wherein said deflection area is raised beginning on each of said blade arms and extending in a straight line at 27 degrees until reaching its height and the top portion of said deflection area is parallel to said leading edge;
   h. wherein there is a curved radius between any two said blade arms positioned next to each other, where said end to said blade arms is generally uniform and on the same horizontal plane; and
   i. wherein said blade arms have a thickness of 0.125 to 0.25 inches.

2. Said apparatus of claim 1, wherein an angle of separation is from 75 to 90 degrees inclusive for said blade arms.

3. Said apparatus of claim 1, where said deflection area is in a range of 30 to 36 percent of said length.

4. Said apparatus of claim 1, where said deflection angle of said blade arms is in a range of 25 to 29 degrees.

5. Said apparatus of claim 1, wherein said offset begins at 3.5 inches measured from said center axis of rotation.

6. Said apparatus of claim 2, wherein said angle of separation is 90 degrees.

7. Said apparatus of claim 3, wherein said deflection area is 33 percent of said length.

8. Said apparatus of claim 1, wherein said recessed depth contains a plurality of evenly distributed mounting holes.

9. A process of making said apparatus comprising the steps of:

a. selecting a single metal or metal alloy sheet of the desired thickness and composition;

b. cutting, stamping, or laser cutting said sheet into a shape that corresponds to the desired blade dimensions arranged as said four blade arms;

c. bending and pressing said offset on each of said blade arms;

d. raising a deflection angle to create a deflection area on each of said blade arms;

e. sharpening said blade arms on said leading edge in the range of 30 to 60 percent of said length; and f. tempering said apparatus to within industry recognized standards to produce a uniform hardness.

\*    \*    \*    \*    \*